May 8, 1945.  G. LAUBE  2,375,420

LENS CAP

Filed Jan. 11, 1943

INVENTOR
Grover Laube
BY
ATTORNEY

Patented May 8, 1945

2,375,420

UNITED STATES PATENT OFFICE 2,375,420

LENS CAP

Grover Laube, Los Angeles, Calif., assignor to Twentieth Century-Fox Film Corporation, Los Angeles, Calif., a corporation of New York Application January 11, 1943, Serial No. 471,954

5 Claims. (Cl. 88—57)

This invention relates to camera accessories and deals particularly with a novel lens cap.

The lens cap to be described hereinafter has been designed primarily for use upon a motion picture camera such as is used in motion picture studios but it will become evident to those versed in the art that the same type of cover with modifications in dimensions may be used on all types of cameras, including those used in the field of miniatures, portraits, commercial, professional and amateur.

In all camera work it is customary to cover the lens when not in use. Various types of covers have been used for this purpose but up to the present no cap has been entirely satisfactory since it either deteriorates too fast with use, or becomes inadvertently dislodged too easily, or if it is a tight fitting cap it requires so much force to put on and take off that the lens mount is apt to become strained and damaged.

The lens cap embodied in this invention has been designed to provide a light, durable cover which can be easily and rapidly mounted or dismounted without placing undue stress upon the lens mount. In its preferred form, it comprises a casing having an expansible pressure ring which is adapted to frictionally engage the front rim of the lens mount with a yielding pressure. Part of the novelty of the invention resides in the type of ring used and the manner in which it is yieldingly mounted in the casing to provide a uniform fixed tension which does not change with use. One advantage of using a ring of this type is that the ring may be made of suitable material which will withstand abrasion and will not deteriorate with exposure to the elements.

Other objects and advantages will become apparent as the description proceeds in conjunction with the drawing in which.

Briefly stated, the invention amounts to the combination of a cup-shaped casing having a spring pressed floating ring mounted in the rim of the casing so that the full diameter of the front end of the lens mount may be forced into the ring where it is gripped by friction and the cap is securely held over the lens.

Figure 1:
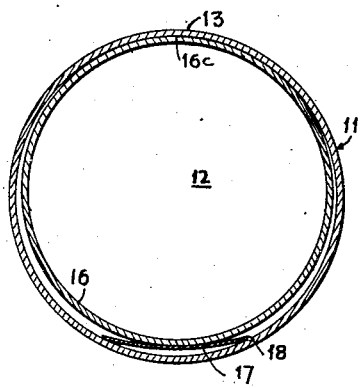
Figure 1 is a section on line 1—1 of Figure 2 of my lens cover.
Figure 2:
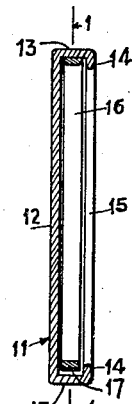
Figure 2 is a section on line 2—2 of Figure 3.
Figure 3:
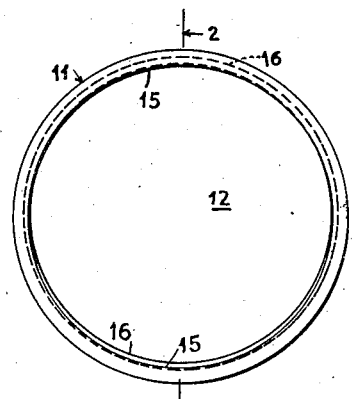
Figure 3 is a front elevation.
Figure 4:
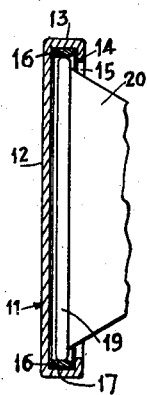
Figure 4 is a fragmentary view showing my lens cover in section as it would be mounted over a lens.

Referring to the drawing for a more complete description of the device and particularly to Figures 2 and 3, it can be seen that my cap comprises a casing generally designated 11. The casing as above stated may be cup-shaped or it may be described as having a flat disklike wall 12 bounded by an outer rim 13, which in turn is formed with a return bend flange 14, thereby leaving a circular opening 15 formed by the flange 14. The opening 15 is made substantially the same diameter as the end of the lens mount that receives the cap. This structure gives a recess in the rim 13 into which I insert a ring 16 which is split as shown at 16c. The outer diameter of the ring 16 is somewhat less than the inner diameter of the rim 13 to allow expansion of the ring. The amount of difference in these two diameters would be determined by practice and will vary for different sizes of caps. Also, the inner diameter of the ring is slightly less than the diameter of the circular opening 15, and is likewise less than the outer diameter of the outer end of the lens mount, to allow for expansion of the ring when the cap is mounted on the front end of the mount. Both the flange 14 and the edge of the ring 16 are rounded as shown in Figures 2 and 4 to allow for easy entrance of the lens mount into the cap. The ring 16 is held in a tight, closed position within the rim 13 by means of a spring 17 which, as shown, is a short, flat leaf spring substantially the same width as the ring and is placed in the recess as best shown in Figure 3. One end of the spring may be turned as illustrated at 18 to allow it to dig into the inner surface of the rim 13 and prevent its moving around within the recess. In practice it was found that if the spring was placed diametrically opposite the cut in the ring, the best results were obtained. Under the arrangement just described, the spring 17 will exert a force which holds the ring 17 pressed against the upper inner surface of the rim 13, thereby forming an eccentric arrangement of the inner ring with the rim. The purpose of this is to hold a part of the ring outside the inner diameter of the flange 14 forming the opening 15 so that the outer end of the lens mount may be inserted into the cap in a cocked position somewhat similar to the way tires are mounted on drop center rims. In Figure 1, it can be seen how this arrangement holds the ring 16 in an eccentric position so that the upper part of the ring falls behind the flange 14 while the opposite part of the ring comes from behind the flange and is shown on the bottom of the view in Figure 1.

The cap is mounted over a lens by hooking one side of the flange 14 over the outer rim 19 of a lens mount (fragmentarily shown) and then by a gentle pressure forcing the cap home until the ring 16 completely encircles the rim 19. In this position the cap is held by friction between the ring and the rim 19 and the ring may be of any suitable, non-deteriorating material to produce a satisfactory gripping action. The cap is best dismounted by tipping it slightly before applying force to remove it. After it has been tipped, it may be taken off with no appreciable force, thus insuring the mount against any unnecessary stress or strain.

A lens cap of the foregoing construction, made of suitable material, will provide a durable, inexpensive, light means for covering lenses of all types.

I claim:

1. A lens cap comprising a casing having an upstanding rim with an internal recess therein, a split ring of slightly less diameter than said recess mounted in said recess, and a comparatively short section of a leaf spring inserted behind said ring in said recess adapted to hold said ring closed and eccentric with respect to said recess.

2. A lens cap comprising a casing having a flat wall and an upstanding circular flange on said wall, an inwardly extending flange on said circular flange spaced from said wall forming a circular opening adapted to receive the front end of a lens mount, a split ring mounted inside said circular flange between said wall and said inwardly extending flange, the outside diameter of said ring when closed being slightly less than the inside diameter of said circular flange, the inside diameter of said ring when closed being slightly less than the diameter of said circular opening, and a comparatively short section of a flat leaf spring inserted between said ring and said circular flange adapted to hold said ring in a closed position.

3. A lens cap comprising a casing having a disklike wall and an upstanding circular flange on said wall, an inwardly extending flange on said circular flange spaced from said wall forming a circular opening adapted to receive the front end of a lens mount, a split ring mounted inside said circular flange between said wall and said inwardly extending flange, the outside diameter of said ring when closed being slightly less than the inside diameter of said circular flange, the inside diameter of said ring when closed being slightly less than the diameter of said circular opening, and a comparatively short section of a flat leaf spring inserted between said ring and said circular flange adapted to hold said ring closed in an eccentric position with respect to said circular opening.

4. A lens cap comprising a casing having a flat wall and an upstanding circular flange on said wall, an inwardly extending flange on said circular flange spaced from said wall forming a circular opening adapted to receive the front end of a lens mount, a split ring mounted inside said circular flange between said wall and said inwardly extending flange, the outside diameter of said ring when closed being slightly less than the inside diameter of said circular flange, and a comparatively short section of a flat leaf spring mounted between said split ring and said circular flange adapted to hold said ring closed in an eccentric position with respect to said circular flange.

5. A lens cap comprising a circular closure disk having an upstanding flange on the periphery thereof, there being an internal recess in said flange, a ring mounted in said recess, said ring being cut transversely at one point thereof and of slightly less diameter than said recess to allow expansion of the ring, and a comparatively short section of a flat leaf spring in said recess behind said ring for holding said ring slightly eccentric with respect to said flange.

GROVER LAUBE.